United States Patent Office 3,699,074
Patented Oct. 17, 1972

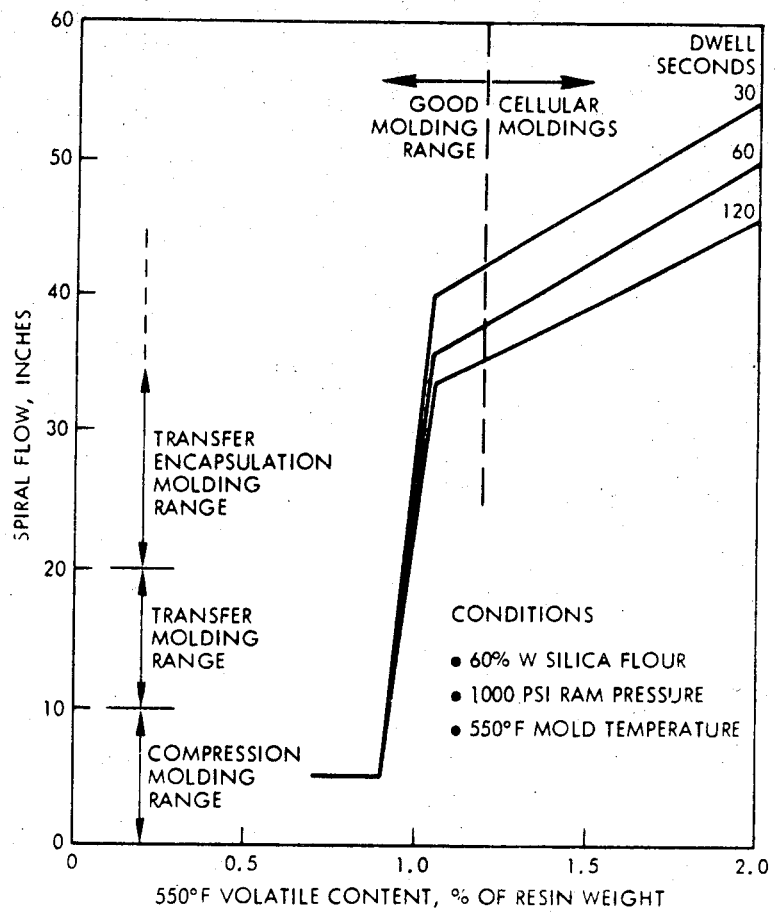

---

3,699,074
POLYIMIDE PREPOLYMER MOLDING POWDERS
Hyman R. Lubowitz, Hawthorne, William P. Kendrick, Manhattan Beach, John F. Jones, Torrance, and Eugene A. Burns, Palos Verdes, Calif., assignors to TRW Inc., Redondo Beach, Calif.
Continuation-in-part of application Ser. No. 671,973, Oct. 2, 1967. This application Aug. 21, 1970, Ser. No. 65,772
Int. Cl. C08g 20/32, 51/02, 51/10
U.S. Cl. 260—37 N     2 Claims

ABSTRACT OF THE DISCLOSURE

This invention relates to polyimide prepolymer powders and to the process for preparing same, and more specifically, to polyimide prepolymer molding powders having particles with surface areas ranging from about 1 to 800 square meters per gram. More particularly, this invention relates to molding powders prepared from polyimide prepolymers having an average molecular weight ranging from about 500 to 6,000. The prepolymers are prepared by reacting approximately stoichiometric amounts of at least one polyfunctional amine, e.g., an aromatic diamine, one or more polyfunctional anhydrides and a monoanhydride characterized by the formula:

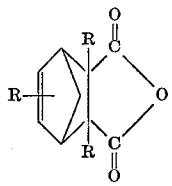

wherein R is selected from the group consisting of hydrogen, lower alkyl radicals having 1 to 5 carbon atoms and combinations thereof.

---

The invention described herein was made in performance of work under a NASA contract and is subject to the provisions of Section 305 of the National Aeronautics and Space Act of 1958, Public Law 85–568 (72 Statute 435; 42 USC 2457).

This application is a continuation-in-part of copending application Ser. No. 671,973 filed on Oct. 2, 1967, now abandoned.

Presently, high-molecular weight polyimide molding powders are obtained from the precursors, i.e., the polyamide-acids which are thermally, oxidatively and hydrolytically unstable, and therefore must be prepared under carefully controlled process conditions. Generally, in preparing the polyimides, the precursors, i.e., the polyamide-acids, undergo two competing reactions. One is hydrolysis which breaks the chains thereby degrading the polymer and the other is the conversion of the precursor to the desired corresponding polyimide. These two reactions, however, compete with one another and unless something is done to prevent significant hydrolysis, a useless product will be obtained. Moreover, utilizing the powders prepared by processes known heretofore required special techniques to avoid or at least minimize the porosity which occurs in the final product due to the volatile matter generated during the curing process. Alternative attempts to utilize the cured polyimide polymers as a molding powder in place of the precursor were not feasible due to the fusion temperatures of these polymers which were too high to allow molding with conventional equipment.

Accordingly, to avoid these and other problems and to provide molding powders which are stable at ambient temperatures, it has been found that molding powders can be prepared from comparatively low-molecular weight polyimide prepolymers. These polyimide prepolymer powders are thermally and hydrolytically stable at comparatively high temperatures and therefore can be used without difficulty in preparing molded articles with conventional techniques. More particularly, the polyimide molding powders of this invention are substantially completely imidized prepolymers having molecular weights ranging from about 500 to 6,000 and are stable in the solid state at temperatures ranging up to about 200° C. The polyimide molding powders may be characterized as substantially solvent-free particles having surface areas ranging from about 1 to 800 square meters per gram and therefore may be cured, in the mold, without the evolution of a substantial amount of volatile matter. Thus, the use of these polyimide prepolymers as molding powders eliminates the precautions normally required heretofore in utilizing polyamide-acids and provides a molding powder which is considerably more attractive.

Accordingly, it is an object of this invention to provide completely imidized molding powder of comparatively low-molecular weight.

It is another object of this invention to provide a polyimide prepolymer molding powder which can be easily cured to a high-molecular weight polyimide resin under conditions normally used in conventional molding processes.

It is another object of this invention to provide a process for preparing polyimide molding powders which are thermally and hydrolytically stable and can be cured, in situ, to substantially non-porous molded articles.

It is still a further object of this invention to provide a polyimide molding powder which may be used with conventional molding techniques for preparing articles without the release of substantial amounts of volatile materials.

It is still a further object of this invention to provide molded articles characterized as having improved strength and a low-void content which are obtained from polyimide prepolymers of comparatively low-molecular weight.

These and other objects of the invention will become apparent from a further and more detailed description of the invention as follows:

It has been found, according to this invention, that molding powders of polyimide prepolymers can be obtained by reacting approximately stoichiometric amounts of at least one polyfunctional amine, e.g., an aromatic diamine, one or more polyfunctional anhydrides, e.g., an aromatic dianhydride, and at least one monoanhydride characterized by the formula:

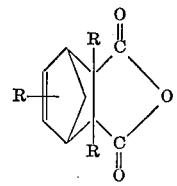

wherein R is selected from the group consisting of hydrogen, lower alkyl radicals having 1 to 5 carbon atoms per molecule and combinations thereof. The polyimide prepolymers from which the molding powders are obtained have average molecular weights ranging from 500 to 6,000 and more preferably from 500 to 3,000. These prepolymers are prepared by reacting at least one polyfunctional amine with a mixture of anhydrides consisting essentially of at least one polyfunctional anhydride and a specific monoanhydride wherein said monoanhydride is present in the mixture in an amount ranging from about 5 to 60 mol percent.

The polyimide prepolymers may be characterized as chain-extended polyimides of comparatively low-molecular weight which contain an aliphatic and/or aromatic backbone with a specific end-capping or terminal group, e.g., 3,6 - endomethylene-1,2,3,6-tetrahydrophthalic anhydride. These particular end-capping groups are substantially stable at ambient temperatures and are capable of becoming chemically reactive at temperatures above 200° C. While it is not completely understood, it is believed that the prepolymers having the particular monoanhydride, e.g., 3,6-endomethylene-1,2,3,6-tetrahydrophthalic anhydride in the molecular terminal position when heated to temperatures above 200° C. become reactive and pyrolytically polymerize to provide di- and terpolymer molecular linkages producing 3-dimensional macromolecules of higher molecular weight. Accordingly, since polymerization proceeds pyrolytically by reaction of the monoanhydride group, it is obvious that this kind of polymerization, which is essentially an addition-type of reaction, takes place without the release or formation of a substantial amount of volatile material. Thus, it is possible to produce or prepare products, e.g., molded articles having a low-void content, since said articles are obtained from low-molecular weight prepolymers which are pyrolytically converted to a completely cured polyimide resin. The fact that said polyimide prepolymers are substantially completely imidized, and since said prepolymers are pyrolytically cured to the corresponding resin, there is little, if any, volatile material, e.g., water or solvent, produced during the formation of the article in the mold, and therefore the resulting products are substantially free of voids, i.e., less than 2% by volume.

The polyimide prepolymers are converted in the mold to polyimide resins having average molecular weights of at least 10,000 as illustrated by the following equation:

other words, the polyimide prepolymers may be converted to particle sizes ranging up to about 600 mesh by various means including grinding, grating, cutting, etc. These powder-forming means may be performed using standard equipment including, for example, ball mill, crushers, polarizers, extruder cutters, etc.

The polyimide prepolymers from which the molding powders are obtained are prepared from various polyfunctional amines, including the diamines, triamines and tetra-amines either alone or in combination in any relative proportion. However, the preferred polyfunctional amines include the diamines, e.g., aromatic diamines containing at least one benzene ring and preferably two benzene rings. The aliphatic amines which may be used either alone or in combination with the aromatic amines may have preferably from 5 to 22 carbon atoms per molecule as illustrated herein below.

2,5-dimethylhexamethylene diamine;
2,5-dimethylheptamethylene diamine;
5-methyl-nonamethylene diamine;
2,17-diamine-eicosadecane;
1,4-diaminocyclohexane;
1,10-diamino-1,10-dimethyl decane;
1,12-diamino-octadecane;
paraphenylene diamine;
meta-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diaminodiphenyl ether;

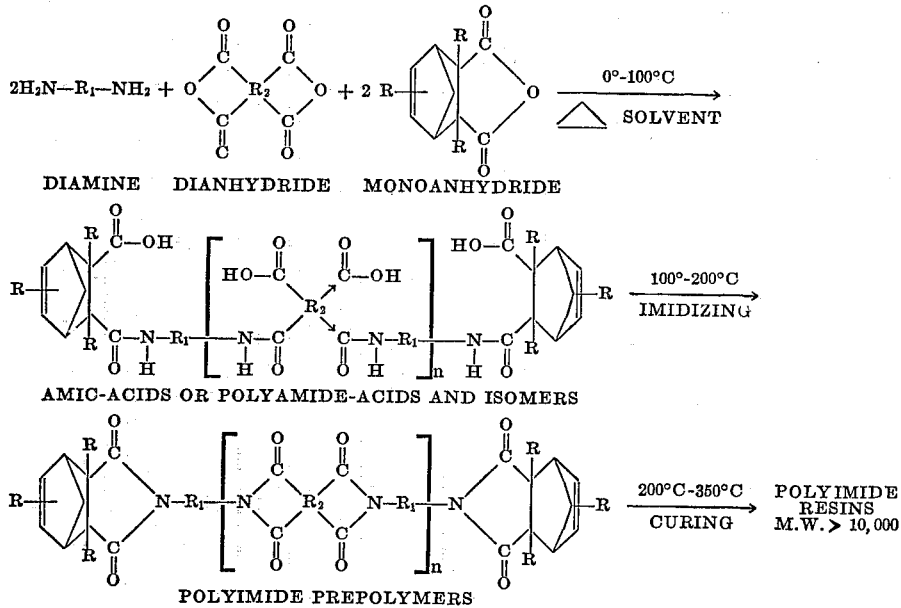

The polyimide prepolymers from which the molding powders are obtained, as illustrated in the above equation, are converted to substantially non-porous articles at temperatures ranging up to about 350° C. and at pressures ranging from atmospheric pressure to about 50,000 p.s.i. More preferably, the temperatures range from about 200° C. to 350° C. at pressures ranging from about 200 to 1500 p.s.i.

The polyimide prepolymers are converted to molding powders with surface areas ranging from about 1 to 800 square meters per gram and preferably from about 60 to 500 square meters per gram. The surface areas may be measured by absorption of nitrogen from a gas stream of nitrogen and helium at liquid nitrogen temperatures using the techniques described by F. M. Nelson and F. P. Eggersten (Analytical Chemistry 30, 1387 [1958]). In 1,5-diamino-naphthalene;
3,3'-dimethoxy benzidine;
2,4-bis-(beta-amino-t-butyl)toluene;
bis-(para-beta-amino-t-butyl-phenyl)ether;
bis-(para-beta-methyl-delta-amino-pentyl)-benzene;
bis-para-(1,1-dimethyl-5-amino-pentyl)benzene;
1-isopropyl-2,4-meta-phenylene diamine;
m-xylylene diamine;
p-xylylene diamine;
hexamethylene diamine;
heptamethylene diamine;
octomethylene diamine;
nonamethylene diamine;
decamethylene diamine;
diamino-propyl tetramethylene diamine;
3-methylheptamethylene diamine;

4,4'-dimethylheptamethylene diamine;
2,11-diamino-dodecane;
1,2-bis-(3-amino-propoxy)-ethane;
2,2-dimethyl propylene diamine;
3-methoxy-hexamethylene diamine;
3,3'-dimethyl benzidine, etc., and
triamines such as
1,3,5-triaminobenzene;
2,4,6-triamino-s-triazine;
1,2,3-triaminopropane;
4,4',4''-triaminotriphenyl methane;
4,4',4''-triaminotriphenylcarbinol, etc.

The polyfunctional anhydrides which may be employed in preparing the prepolymer polymerizates of this invention are preferably dianhydrides, although the tri- and tetra-anhydrides may be used. The polyfunctional anhydrides which are particularly preferred, e.g., aromatic anhydrides containing at least one benzene ring, are included and merely represent a number of various anhydrides which may be used either alone or in combination in any proportion, e.g., ranging from 0 to 100% by weight. An example of the anhydrides which may be used for purposes of this invention includes:

Pyromellitic dianhydride;
benzophenone tetracarboxylic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl)propane dianhydride;
3,4,9,10-perylene tetracarboxylic dianhydride;
bis(3,4-dicarboxyphenyl)ether dianhydride;
ethylene tetracarboxylic dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrrolidine-2,3,4,5-tetracarboxylic dianhydride;
pyrazine-2,3,5,6-tetracarboxylic dianhydride;
2,2-bis(2,3-dicarboxyphenyl)propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl)sulfone dianhydride;
benzene-1,2,3,4-tetracarboxylic dianhydride;
1,2,3,4-butane tetracarboxylic dianhydride;
thiophene-2,3,4,5-tetracarboxylic dianhydride, etc.

In preparing the polyimide prepolymers the reaction may be carried out in an organic solvent or dispersant which may include various liquids whose functional groups do not react with the prepolymers. More specifically, the organic solvents and/or dispersants may comprise the N,N-dialkylcarboxyl amides in general. The preferred solvents, however, are the lower molecular weight materials including N,N-dimethyl formamide, N,N-dimethyl acetamide, N,N-diethyl formamide, N,N-diethyl acetamide, N,N-dimethylmethoxyacetamide, etc. In addition, solvents which may be used include the dimethylsulfoxides, N - methyl - 2-pyrrolidine pyridine These solvents may be used either alone or in combination with other organic liquids, including, for example, benzene, dioxane, toluene, xylene, cyclohexane, and various mixtures thereof in any proportion.

The polyimide prepolymer from which the molding powders are obtained may be characterized by the formula:

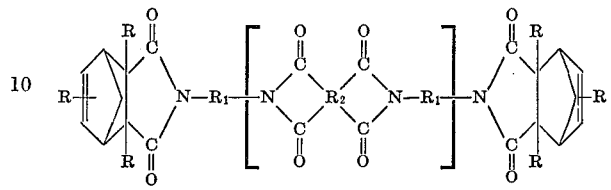

wherein $n$ has a value ranging from 1 to 20 and preferably 1 to 15, R is selected from the group consisting of hydrogen, lower alkyl radicals of 1 to 5 carbon atoms and combinations thereof, i.e., methyl, ethyl, propyl, butyl, and amyl radicals; $R_1$ is selected from the group consisting of an aryl radical, an alkyl radical, a cycloalkyl radical, an aralkyl radical, an alkaryl radical, an alkylene radical, an arylene radical, a substituted aryl radical, a substituted alkyl radical, a heterocyclic aryl radical, and a substituted aralkyl radical of a polyfunctional amine; $R_2$ may be either the same or different from $R_1$ and is selected from the group consisting of an aryl radical, an alkyl radical, a cycloalkyl radical, an aralkyl radical, an alkylene radical, an arylene radical, a substituted aryl radical, a substituted alkyl radical, a heterocyclic aryl radical and a substituted aralkyl radical of a polyfunctional anhydride.

The polyimide prepolymers, e.g., molecular weights ranging from 500 to 6,000 may be utilized either in the neat form or in combination with any of the well known fillers including, for example, fibers and powders of carbon, metals, boron, silicates, asbestos, synthetic materials, metal oxides, and particularly the glass and carbon fibers as specifically disclosed in U.S. Pat. Nos. 3,053,775 and 3,011,981. These fillers and various combinations thereof, particularly silica, may be used in preparing the molded articles in amounts ranging from about 0 to 85% and preferably from about 10 to 60% by weight of the total composition.

The following examples illustrate the preparation of prepolymer varnishes from which the molding powders are obtained.

EXAMPLE I

Approximately 40.7 parts by weight of 4,4'-methylene dianiline, 32.8 parts by weight of 3,6-endomethylene-1,2,3,6-tetrahydrophthalic anhydride and 33.9 parts by weight of 3,3',4,4'-benzophenone tetracarboxylic acid dianhydride were dissolved in 170 parts by weight of dimethyl formamide.

EXAMPLE II

A solution was prepared by mixing approximately 1,000 parts by weight of dimethyl formamide and 100 parts by weight of toluene to which was added 122.7 parts by weight of 4,4-oxydianiline. The solution was stirred until all of the diamine was in solution and 98.4 parts by weight of 3,6-endomethylene-1,2,3,6-tetrahydrophthalic anhydride and 100.8 parts by weight of 3,3', 4,4'-benzophenone tetracarboxylic acid dianhydride were added slowly, with stirring, until a solution was obtained.

EXAMPLE III

Approximately 87.0 parts by weight of 4,4'-oxydianiline were dissolved in a solvent mixture of 700 parts by weight of dimethyl formamide and 700 parts by weight of toluene. To this solution was added 65.6 parts by weight of 3,6-endomethylene-1,2,3,6-tetrahydrophthalic anhydride and 63.0 parts by weight of 1,4,5,8-naphthalene tetracarboxylic dianhydride.

EXAMPLE IV

Two solutions were prepared (1) consisting of approximately 57.43 parts by weight of 4,4'-methylene dianiline with 75.0 parts by weight of dimethyl formamide and (2) 35.58 parts by weight of 3,6-endomethylene 1,2,3,6-tetrahydrophthalic anhydride with 40.0 parts by weight of dimethyl formamide. A third mixture was prepared consisting of approximately 58.36 parts by weight of 3,3',4,4'-benzophenone tetracarboxylic dianhydride with 43.5 parts by weight of dimethyl formamide. These preparations were then blended together and reacted to provide a polyamide-acid solution.

The varnishes described above were converted to molding powders and molded articles as described below:

EXAMPLE V

A 500 ml. portion of the reactants, as prepared in Example I, was placed in a round-bottomed flask fitted with a stirring apparatus, thermometer, heating mantle, condenser and receiver. Heating was commenced and the temperature was increased from about 24° C. to about 200° C. over a period of about an hour. At the end of this heating, about 250 ml. of liquid had been removed from the vessel. The contents of the vessel were transferred to a pan which was placed in a forced-air oven for about 26 hours. The resulting solid material was ground on a ball mill to about 60 mesh. The powder was mixed with an equal amount of a 300 mesh silica flour and pressed for about 55 minutes at 325 p.s.i. and at a temperature of about 315° C. The resulting discs were smooth and uniform in appearance and had a Barcol hardness of about 65.

EXAMPLE VI

A 500 ml. portion of the reactants as prepared in Example II was placed in a round-bottomed flask fitted with a stirring apparatus, thermometer, heating mantle and condenser and receiver. Heating was commenced and the temperature increased from about 24° C. to about 200° C. over a period of about two hours. At the end of the two-hour heating period, the material was transferred to a liter round-bottomed flask and solvent was removed using a rotary evaporator. After the material had formed a cake, the cake was transferred to a pan and placed in a 110° C. vacuum oven for about 16 hours. The material was then ball milled to about a 60 mesh powder. Discs were prepared from the powder by molding in a press for about one hour at 315° C. at 325 p.s.i. The resulting disc had a Barcol hardness of 50.

Although current technology suggests the preparation of polyamide-acids prepolymer as a varnish in an appropriate solvent, the purpose of this invention is to prepare a fully formed polyimide prepolymer as a solution or dispersion. The technique involves dissolving the reactants in a solvent, i.e., dimethyl formamide, followed by refluxing said reactants for periods ranging up to about 18 hours. At the end of the reflux, a product is precipitated from the solution which may be characterized as a fully imidized polyimide prepolymer of comparatively low-molecular weight. The solids may be isolated from the solvent by filtration or by other means whereupon the mother liquor from the filtration is either evaporated in a vacuum or used directly as a slurry in combination with the imide prepolymer in the form of a paste.

In preparing the prepolymers of this invention, the polyfunctional amines, e.g., aromatic amines, polyfunctional anhydrides, e.g., aromatic anhydrides and the monoanhydrides may be coreacted in any sequence in the presence of one or more organic solvents. Preferably, however, the prepolymers are obtained by first reacting the polyfunctional amine with the monoanhydride and then with the polyfunctional anhydride in a solvent, e.g., containing dimethyl formamide. Although it is not necessary, it is preferred to react the polyfunctional amine with the monoanhydride and the polyfunctional anhydride in that particular order. These reactants are utilized in approximately stoichiometric proportions, i.e., the equivalence of amine are calculated to substantially equal the equivalence of the total dianhydride and monoanhydride content. However, in some instances, it may be desirable to use an excess, e.g., up to about 5% by weight of either the amine or the anhydrides beyond the stoichiometric calculations depending upon the particular reactants and the ultimate use of the product. More specifically, the polyfunctional amines are coreacted with a mixture of the polyfunctional anhydrides and monoanhydrides wherein the monoanhydride ranges from about 1 to 60 mol. percent and preferably from 5 to 40 mol. percent of the anhydride mixture.

It has been found that the polyimide prepolymers containing about 1% by weight of volatile matter has adequate flow to fill a variety of complex mold cavities and form essentially void-free moldings. Samples of the polyimide prepolymer powders were dry-blended with silica flour and transfer-molded using a Hull spiral-flow mold. The data in Table I shows the spiral flow values obtained with a range of the four inherent volatile matter content powders. The molding conditions used in obtaining these data were determined by experimentation in which dwell times, molding pressures, mold temperatures, cure times, and polyimide prepolymer powder-to-silica ratio were varied to determine the optimum values.

It is noted from the data in Table I that an inherent volatile matter content of about 1% by weight in the polyamide prepolymer can provide a satisfactory molding powder. Powders with volatile matter contents in this range are easily obtained whereby, for example, the material may be heated for about two hours at temperatures of about 175° C. followed by heating at temperatures of about 200° C. to provide a product with an inherent volatile matter content of about 1%.

TABLE I.—SPIRAL FLOW AS A FUNCTION OF PPP [c] INHERENT VOLATILE MATTER CONTENT (Equal Parts by Weight Polyimide-Prepolymer —325 Mesh Silica)

| Sample | Inherent volatile matter, weight percent | Flow, inches [a] | Comments | Barcol hardness |
|---|---|---|---|---|
| A | 0.69 | [b] 4½ | Poor flow, not porous | 70–74 |
| B | 1.06 | 40 | Excellent part | 75 |
| C | 1.55 | 37 | Slightly porous | 65–70 |
| D | 1.66 | 36 | Voids, poor part | 70–74 |

[a] Conditions: Hull spiral flow mold. Two hand-pressed, preformed tablets were charged; 5.0 gm. each. Dwell: 60 seconds. Mold temperature: 290° C. (550° F.) (see Appendix A). Cure time: 30 minutes. Molding pressure: 1,000 p.s.i.g. Flow values are repeatable within ±10%.
[b] Pure resin had a ten-inch flow under the same conditions.
[c] Polyimide prepolymers powders.

FIG. 1 shows a plot of volatile matter content versus the spiral flow for three dwell time studies. All of the tests were performed at 550° F. with 1,000 p.s.i. for about 30 minutes cure time. It is evident that there is a very sharp point of inflection at about 1% volatile matter content. The sharp break shows that both compression and transfer molding compounds (low and high flow, respectively) can be made from low-volatile matter content powders. All specimens molded from compounds utilizing powder with 1.2% volatile matter content or less were well cured and free from cellularity.

The polyimide prepolymer molding powders of this invention are suitable for a variety of purposes and particularly, for example, they may be used in a fluid-bed coating process for protecting various substrates, i.e., metal surfaces when exposed to temperatures ranging up to 375° C. More particularly, it has been found desirable in preparing protective coatings to preheat the substrate to temperatures ranging from about 200° C. to 315° C. and subsequently immersing the substrate in a fluidized bed of the polyimide prepolymer powders. Subsequently, the substrate, with a coating of the molding powders, is heated at temperatures ranging from about 200° to 350° C. causing the prepolymers to flow and cure onto the surface to form the protective coating.

What is claimed is:

1. A process for the preparation of a polyimide-prepolymer molding powder comprising:
   (A) reacting approximately stoichiometric amounts of at least one (i) polyfunctional amine, at least one (ii) polyfunctional anhydride, and a (iii) monoanhydride in an organic solvent to obtain a polyimide prepolymer having an average molecular weight ranging from about 500 to 6,000; said monoanhydride characterized by the formula

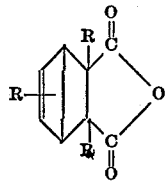

wherein R is selected from the group consisting of hydrogen, lower alkyl radicals having 1 to 5 carbon atoms and combinations thereof;

(B) heating the prepolymer until a volatile content of 1% to 1.2% by weight is obtained;
   (C) comminuting said prepolymer to a particle size having surface area ranging from about 1 to about 800 square meters per gram; and
   (D) blending filler powder into the prepolymer powder.

2. A process according to claim 1 wherein up to 85% by weight filler powder is blended into said prepolymer powder.

References Cited

UNITED STATES PATENTS

| | | | |
|---|---|---|---|
| 3,528,950 | 8/1970 | Lubowitz | 260—78.4 |
| 3,422,064 | 1/1969 | Gall | 260—47 |
| 3,249,588 | 4/1966 | Gall | 260—47 |
| 3,416,994 | 12/1968 | Chalmers | 260—37 X |
| 3,179,634 | 5/1965 | Edwards | 260—78 |

MORRIS LIEBMAN, Primary Examiner

R. ZAITLEN, Assistant Examiner

U.S. Cl. X.R.

260—47 CZ, 78 TF